US006628308B1

(12) United States Patent
Greenberg et al.

(10) Patent No.: US 6,628,308 B1
(45) Date of Patent: Sep. 30, 2003

(54) GRAPHICAL AIDS FOR SURVEYING

(75) Inventors: James N. Greenberg, Christchurch (NZ); Nathan Pugh, Lyttleton (NZ); Stephen O'Neill, Christchurch (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

(21) Appl. No.: 09/321,685

(22) Filed: May 28, 1999

(51) Int. Cl.[7] .................................................. G06F 3/00
(52) U.S. Cl. ...................... 345/764; 345/661; 345/835; 345/839; 340/995
(58) Field of Search ................................. 345/964, 764, 345/440, 835, 839, 661, 676, 846; 340/990, 995; 701/213, 225, 208

(56) References Cited

U.S. PATENT DOCUMENTS

| | | | | |
|---|---|---|---|---|
| 5,233,357 A | | 8/1993 | Ingensand et al. | 342/352 |
| 5,731,997 A | * | 3/1998 | Manson et al. | 364/559 |
| 5,745,074 A | | 4/1998 | Laude | 342/357 |
| 5,760,909 A | | 6/1998 | Nichols | 356/4.08 |
| 5,791,609 A | | 8/1998 | Hankins | 248/124.1 |
| 5,864,481 A | * | 1/1999 | Gross et al. | 364/400 |
| 5,948,040 A | * | 9/1999 | DeLorme et al. | 701/201 |
| 5,977,908 A | * | 11/1999 | Nichols | 342/357.08 |
| 6,140,957 A | * | 10/2000 | Wilson et al. | 342/357.08 |
| 6,182,005 B1 | * | 1/2001 | Pilley et al. | 701/120 |
| 6,282,362 B1 | * | 8/2001 | Murphy et al. | 386/46 |

FOREIGN PATENT DOCUMENTS

| FR | 2722286 | 1/1996 |
|---|---|---|
| JP | 08036045 | 2/1996 |

OTHER PUBLICATIONS

"Trimble Survey Controller 6.0", published by GeoInvest, 1998, http://gps.geoinvest.cz/Datasht/svcv6 1/scv 1.htm, see 'Stakeout'.
"Trimble GPS Total Station 4800", published by GeoInvest, 1998, http://gps.geoinvest.cz/Prod blt/Pb 4800.htm, see the product catalogue for GPS total Station 4800.
Eagle Electronics, "GPS Operation–Navigation Displays", published 1998, http://www.eaglesonar.com/egps/nlguide/gpsops.3htm, see "The Steering Screen".
Automhelm Catalogue 1998/1999, published by Raytheon Marine Europe Limited, 1997/98, England, see p. 30, 'Steer Starboard Harbor Entrance' screen.
Garmin "GPS 38 Personal Navigators" Owener's Manual and Reference, published by Garmin International, 1996, KS USA, See p. 41, "Highway Page".

* cited by examiner

Primary Examiner—Raymond J. Bayerl
Assistant Examiner—Cuong T. Thai
(74) Attorney, Agent, or Firm—Blakely Sokoloff Taylor & Zafman LLP

(57) ABSTRACT

The present invention provides a method and apparatus configured to provide graphical symbols indicative of a separation value between a first and second location, measured from a predetermined reference point. In one embodiment, the separation value relates to at least one of the direct distance between said first and second locations and the angle subtended between said first and second location at the said predetermined reference point. In one embodiment, the separation value may be resolved into mutually orthogonal components. An alpha-numeric display may also be included and configured to represent the magnitude of said separation values.

34 Claims, 11 Drawing Sheets

GRAPHICAL AIDS FOR SURVEYING

FIELD OF THE INVENTION

The present invention is directed towards graphical indicators for use in visual displays/view finders and more particularly, to aid in surveying stakeout operations executed in conjunction with angular and range measuring surveying devices.

BACKGROUND ART

In the field of surveying, stakeout operations normally involve the marking on the grounds of points or areas of specific interest such as boundary intersections, roads, access points for utilities and so forth. Stakeout operations are normally undertaken by two operators, one of whom operates a surveying optical instrument at a fixed reference point, while the other operator is mobile and is equipped with a surveying range pole or similar appropriate device. The optical instrument is capable of accurately determining vertical and horizontal angles and often incorporates an integral Electronic Distance Measuring (EDM) device capable of measuring distances co-axially along the optical axis of the optical instrument. The exact terrestrial location of the fixed reference point where the optical instrument is sited, is (unless already known) first required to be established. This may be achieved by conventional surveying techniques or as is now becoming commonplace, by use of a Global Positioning System (GPS) receiver. The GPS receiver utilizes signals emanating from an orbiting constellation of GPS satellites to calculate its position by known means. The location of the fixed reference point (the 'survey site') may be expressed in terms of any suitable frame of reference, such as the standard GPS reference ellipsoid WGS-84, or (by means of the appropriate transformation) a convenient local system. The stakeout sites may also be defined with respect to the same reference systems or simply by their relative distance and angular orientation from the survey site. The stakeout sites are stored in a data collection and calculation means (referred to as a data collector) which can be integrated into the GPS receiver and/or the optical instruments. The GPS receiver/data collector is linked electronically with the optical instrument, thus permitting either device to display the measurements made by one or both devices.

Once the location of the survey site has been established, the distance and angle to the first stakeout site is calculated and displayed by the GPS data collector/optical instrument. The optical instrument operator (herein termed the 'instrument operator') then directs the second operator by means of suitable signals to move the range pole in the direction and for the distance calculated. After each corrective movement of the range pole, the optical instrument is realigned aligned with the range pole and a distance measurement is effected and recorded, whereupon the data collection/calculation means calculates the new error distance between the current range pole location and the stakeout point. The error distance, (normally expressed as mutually perpendicular components e.g. left, right, in, out with respect to the instrument operator) is conveyed to the second operator as movement instructions, by hand signals, orally or by radio. This iterative procedure is repeated until the error distance between the range pole location and the stakeout site falls within the tolerance threshold specified by the operator and a stake or similar is used to mark the location. In practice, once the optical instrument is aligned at the correct horizontal angle (i.e., the instrument is 'on-line'), normally, only the error distance along the axis between the optical instrument and the stakeout site requires measuring and correcting.

The instrument operator is reliant on the numerical values displayed by the data collector to guide the second operator to the stakeout point and whilst this provides an acceptable result, the speed and efficiency of the above process could be enhanced by the use of suitable visual aids. The human mind is far more receptive to visual cues than alpha-numeric data as a means of executing or instructing specific movements, i.e., guiding the operator and range pole to the stakeout point.

Such visual aids are employed in several position-related applications, such as marine radar and/or GPS displays, wherein the desired course and the actual course are often represented from a third-angle view-point, simulating a three-dimensional perspective. Graphical; symbols are used to denote various factors such as the cross-track course error and the correction required to bring the vessel on course. However, marine-related applications are naturally uninterested in the elevation of the craft and the degree of positional accuracy required is much lower than for surveying purposes.

Such displays typically display range and bearing to a single remote point of interest (e.g. a way-point, harbor, or a hazard of some type), with the aforementioned course correction indication being used to show the action necessary for the user to converge (or avoid, in the case of a hazard) on the same single remote point, i.e., the corrective movement is undertaken by the user/observer and not at the observed/measured remote location.

In contrast, during surveying stakeout operations, the user (the surveyor) is located at a single fixed location and it is a second mobile object (i.e., the range pole held by the second operator) that requires corrective guidance instructions to converge on a; predetermined remote location (the stakeout site). There is thus a subtle though fundamental conceptual and practical difference between the needs and implementation of marine radar type displays and those of a surveying instrument/system used for staking-out.

The use of graphical cues to align/orientate an object such as a surveyor's optical instrument and to direct the movement of a third party or object such as a range pole, would reduce the activity execution time, thus reducing costs and attenuate errors such as the transposition of figures and/or the correct direction of corrective movement.

SUMMARY OF THE INVENTION

In one embodiment, the present invention provides a method and apparatus configured to provide: graphical symbols indicative of a separation value between a first and second location, measured from a predetermined reference point, wherein said separation value relates to at least one of:

(i) the direct distance between said first and second locations and (ii) the angle subtended between sai first and second location at the said predetermined reference point.

The said separation value may be resolved into mutually orthogonal components. The present invention may also includes an alpha-numeric display configured to represent the magnitude of said separation values.

In one embodiment, the graphical symbols include two pairs of opposed arrows orientated vertically and horizontally respectively, denoting the corresponding said separation value component. The arrows point towards a center graphical element (representing either the first or second location) from the location of the other of the first or second location, as seen from the perspective of said predetermined reference point.

If the corresponding separation value component exceeds a predetermined threshold value, a single arrow of either said pair of arrows is displayed. Both arrows of either pair of arrows are simultaneously displayed when the corresponding separation value component is less than said predetermined threshold value. The magnitude of each said separation value and component may be displayed in alphanumeric form adjacent to each corresponding graphical symbol/arrow.

BRIEF DESCRIPTION OF THE DRAWINGS

By way of example only, embodiments of the present invention are described in detail with reference to the accompanying drawings, in which.

DETAILED DESCRIPTION

While the invention will be described in conjunction with certain embodiments, it will be understood that they are not intended to limit the invention to these embodiments. On the contrary, the invention is intended to cover alternatives, modifications and equivalents, which may be included within the scope of the invention as defined; by the appended claims.

Figure 1:
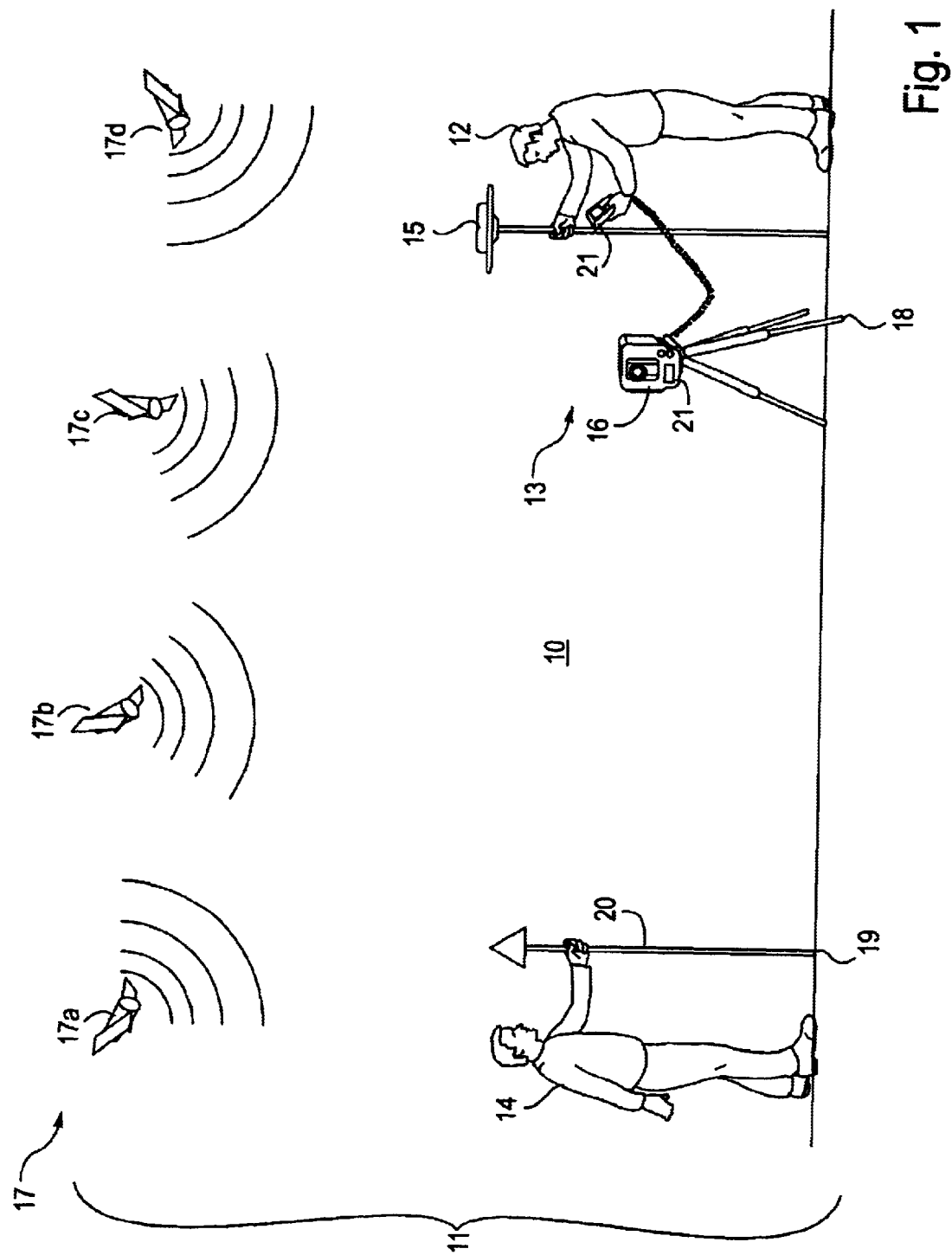
FIG. 1. shows a schematic view of a terrestrial position determining system incorporating one embodiment of the present invention.

FIG. 1 illustrates a schematic representation of one embodiment of the present invention (10) incorporated within a system, denoted generally by the reference numeral (11), for executing position measurements in conjunction with an angular and distance measuring device and a satellite positioning system such as the Global Positioning System (GPS). In the present embodiment, a surveyor's device is described. However, the present invention is applicable to other types of devices that employ position measurements. Furthermore, although the present embodiment describes the use of GPS to acquire positioning signals, other land-based and satellite-based systems may be used, including GLONASS, LORAN-C and Pseduolite systems.

The invention (10) is being applied in this embodiment for the surveying purpose generically known as 'staking-out', in which a first operator (12) in conjunction with a surveying device (13), determines the location of and directs the movement of a second operator (14).

Survey device (13) includes a GPS receiver (15) and an optical instrument (16), which may be either distinct devices (electrically coupled together to enable either device to display the respective measurements made by both devices (15,16)), or releasably attachable to each other or as a completely integrated device.

The optical instrument is of the type typically employed by surveyors to measure angles (e.g. horizontal and vertical angles) and distances. In this embodiment, the optical instrument (16) measures distance by means of an Electronic Distance Measuring (EDM) device integrated within the instrument (16). The EDM, (coincident with the optical axis of the instrument (16)) which is visually aligned with the object of interest using cross hairs sighted through the viewfinder of the optical instrument (16).

The terrestrial position of the GPS receiver (15) is determined in a known manner by calculations derived from signals emanating from a constellation (17) of GPS satellites, four of which (17a,17b,17c,17d) are shown as an example in FIG. 1. Preferably, the GPS receiver (15) is adapted to work with the US government's NAVISTAR GPS satellites.

As will be familiar to those skilled in the art of GPS, receiver (15) incorporates a variety of sub-systems, including an antenna assembly, a GPS processor assembly, RF assembly and a unit generically referred to as a 'data collector' (used as an interface between the GPS receiver and the user for data entry, manipulation and storage) and as used herein, the term 'GPS receiver (15)' is taken to include such sub-systems.

In one embodiment, the receiver (15) is of the type colloquially referred to as a GPS 'total station' such as the Trimble 4800 Total station manufactured by Trimble Navigation Limited, Sunnyvale, Calif., U.S.A. which comprises a pole mounted GPS antenna, data radio and power supply and a 'data collector' (clipped to the pole), and may furthermore, incorporate the capability to receive differential GPS (DGPS) correction signals and/or real-time kinematic (RTK) GPS signals, including GPS reference carrier-phase observations from a terrestrial base-station. The utilization of the above signals by the GPS receiver (15) to determine its terrestrial position is well established.

The object of the surveying procedure of staking-out is to mark the exact location of a number of known sites (the 'stakeout' locations) (19) of specific interest, (e.g. boundary intersections and so forth).

To conduct a stakeout at a predetermined reference point, a first operator (12) initially establishes the location (the 'survey location') (18) of the survey device (13) if not already known, either by conventional surveying techniques and/or by use of the GPS receiver (15). The co-ordinates of each stakeout site (19) are normally stored in the survey device (13) prior to the start of the stakeout and are defined (as is well .known to those skilled in the art of surveying) with respect to either the location of the means (13), i.e. a local frame of reference, or to a regional/global frame of reference such as the standard GPS reference ellipsoid-WGS-84 expressed for example as a co-ordinate system or a latitude and longitude. Thus, once the survey location (18) is known, the survey device (13) is able to calculate the distance to and angular orientation of the stakeout location (19) from the survey location (18).

At present, the first operator (12) (having aligned the optical instrument (16) vertically above the predetermined reference point, i.e. the survey location (18)) orientates the optical instrument (16) in the direction calculated by the survey device (13) to intersect with one of the predetermined stakeout locations (19). This initial procedure is generally referred to as placing the instrument 'on-line'.

The second operator (14) then paces out approximately the calculated distance to the stakeout point (19), where upon the first operator (12) then measures the range and angle from the optical instrument (16) to a range pole (20), held by the second operator (14). The survey device (13) then calculates the angular separation (as measured at the survey location (18)) and distance directly between the range pole (20) and the stakeout point (19), and displays the information numerically on a display (21) located on the optical instrument (16) and/or the data collector within the CGPS receiver (15). The first operator (12) then communicates, either visually, e.g. by hand signals, electrically, e.g. by radio or verbally (depending on the distances involved) the direction and distance the range pole should be moved by the second operator (14) to coincide with stakeout point (19). These correction instructions are usually expressed (with respect to the first operator (12)) in terms of mutually orthogonal components, e.g. 'in, out, left, right', rather than the direct distance and bearing from the second operator (14) to the stakeout point (19), as this could be too difficult for the second operator to assimilate and implement accurately. This sequence i repeated until the distance of the range pole (20) from the stakeout point (19) is within a user-defined tolerance, whereupon the position is marked with a stake or similar.

Figure 9:
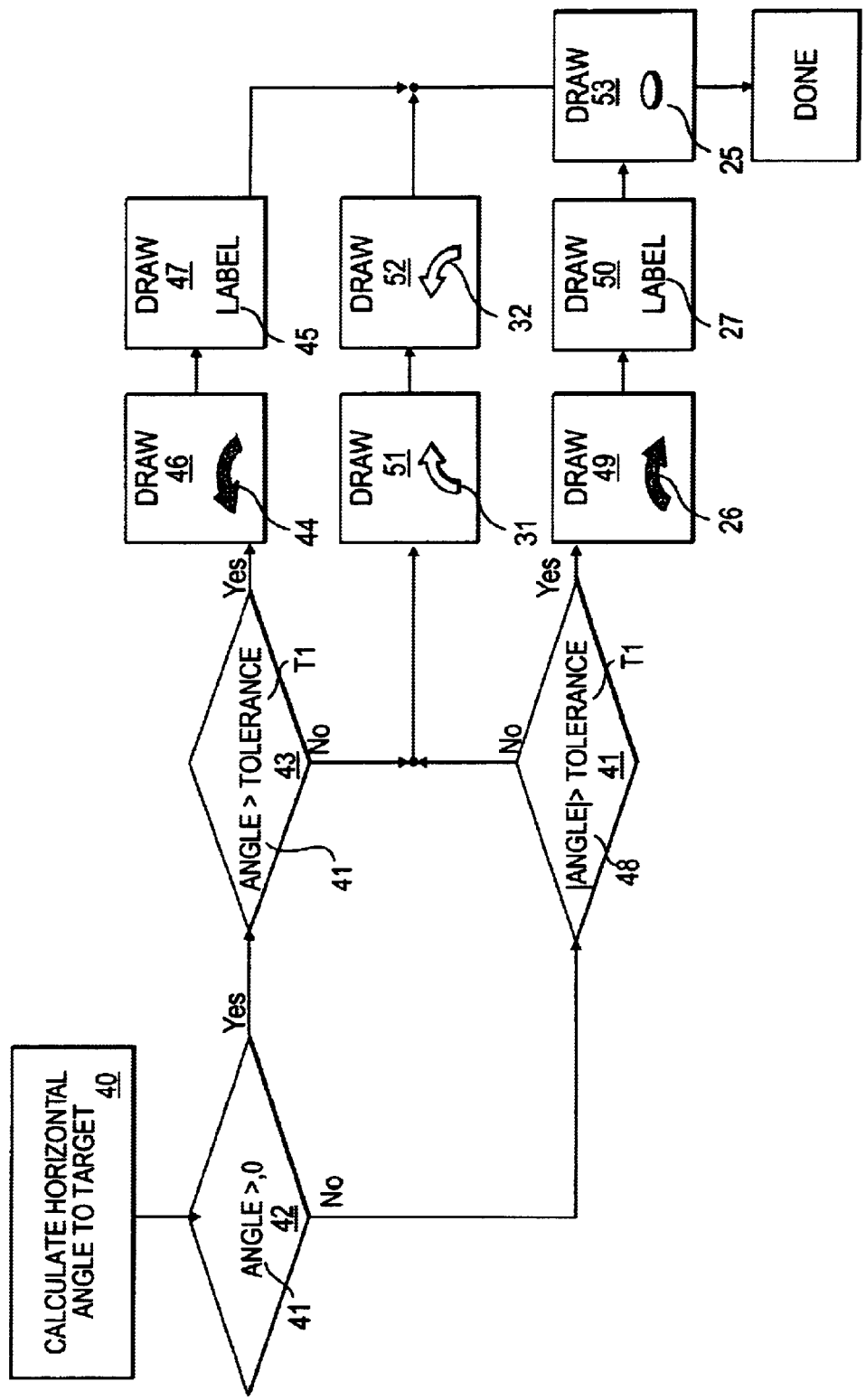
FIG. 9. shows a flow chart illustrating the steps to display predetermined graphical symbols according to one embodiment of the present invention.
Figure 10:
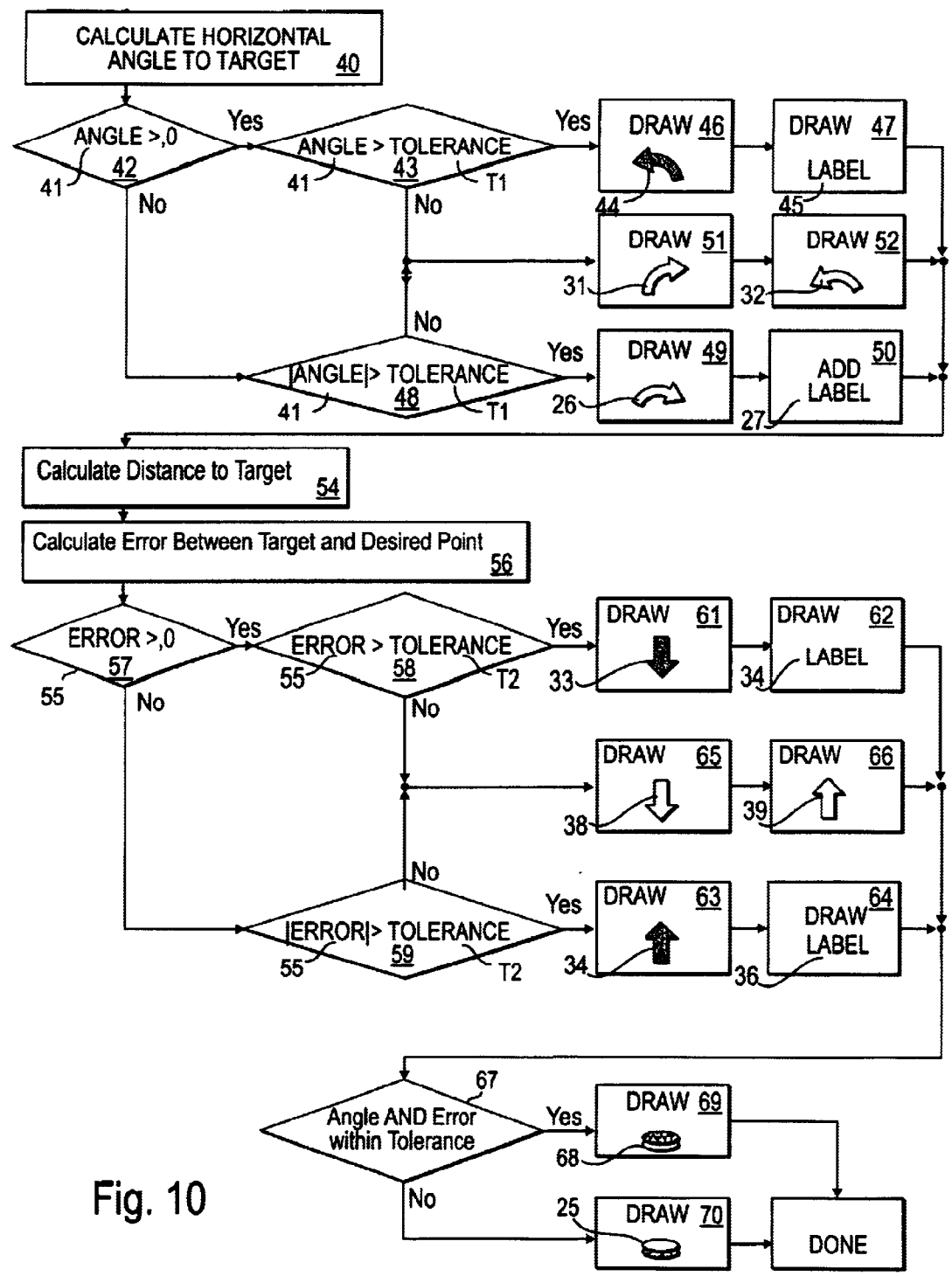
FIG. 10. shows a further flow chart illustrating the steps to display graphical symbols, in the 'Angles and Distances' mode according to one embodiment.

In one embodiment, the present invention (10) provides a graphical display particularly suited to enhancing the ease of use, accuracy and execution time of procedures such as the stakeout procedure described above. FIGS. 2–8 show one embodiment of display (21) which forms part of the user interface with the GPS receiver (15), although as previously stated, the same alphanumerical data may be displayed by the optical instrument (16). The flow charts shown in FIGS. 9–10 illustrate one embodiment of logical steps used to determine the graphical symbols displayed.

Figure 2:
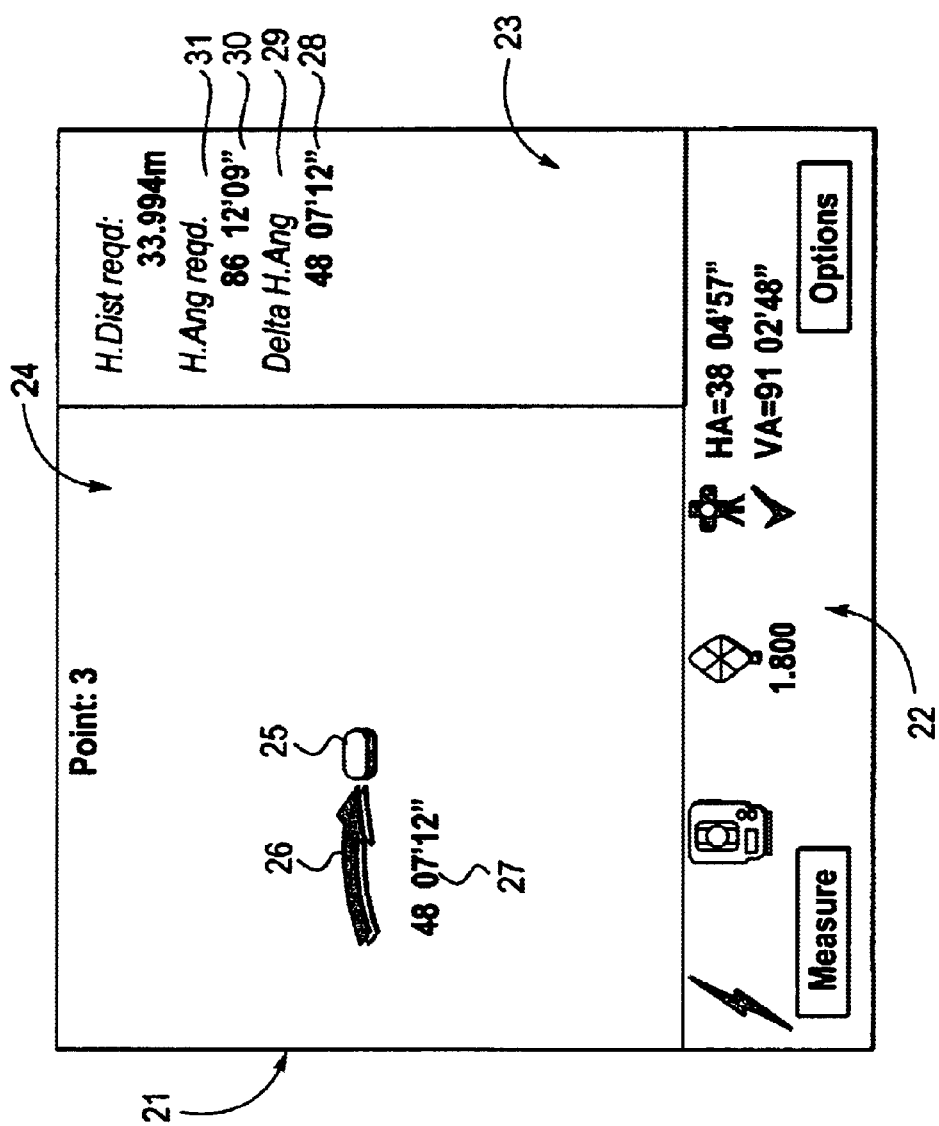
FIG. 2. shows a depiction of a graphical display according to one embodiment of the present invention.

Referring to FIG. 2 the display screen (21) is subdivided into three frames or windows (22,23,24). Frame (22) displays various status icons and parameter indicators of the optical instrument (16). Frames (23) and (24) displays alpha-numeric data and graphical/numerical data respectively, relating to various parameters pertaining to measured and/or calculated locations.

Once the predetermined stakeout points (19) have been stored in the data collector unit of GPS receiver (15) the optical instrument (16) is placed online and the integral EDM is used to measure the relative location of the range pole (20) from the survey location (18). In use, the separation between the range pole (18) and the stakeout point (19) is displayed in frames (23) and (24) in one of several modes as described below:

A circular element (25) in the center of frame (24) denotes the location of interest, i.e. the stakeout point (19). The direction the optical instrument (16) is required to turn to be placed on-line is displayed by a first arrow symbol (26) with its arrowhead pointing towards the circular element (25) (indicating the direction of movement required by the instrument (16)). In one embodiment illustrated in FIG. 2, the arrow (26) is curved along its shaft and exhibits a solid or filled appearance. Adjacent to the arrow (26), a numerical display (27) shows the magnitude of the angle through which the optical instrument (16) needs to be turned to be on-line, i.e., to bring the remote operator to the desired stakeout point. Status information may also be conveyed in other embodiments, as described below.

A solid/filled graphical symbol such as the arrow (26) may be used to indicate that an action is required to correct a positional error whereas a hollow/outline symbol indicates the represented parameter (e.g. distance or angular value) is within the desired tolerance. The curved shaft of arrow (26) may indicate to the operator (12) that the adjacent numerical data (27) refers to an angular and not distance measurement.

Frame (23) also has a display (28) to show the magnitude of angular correction shown in frame (24) under the heading (29) Delta H. Ang. (abbreviation for Delta Horizontal Angle), together with the horizontal angle value (30) of the stake-out site (19) under the heading H. Ang reqd (31).

Figure 3:
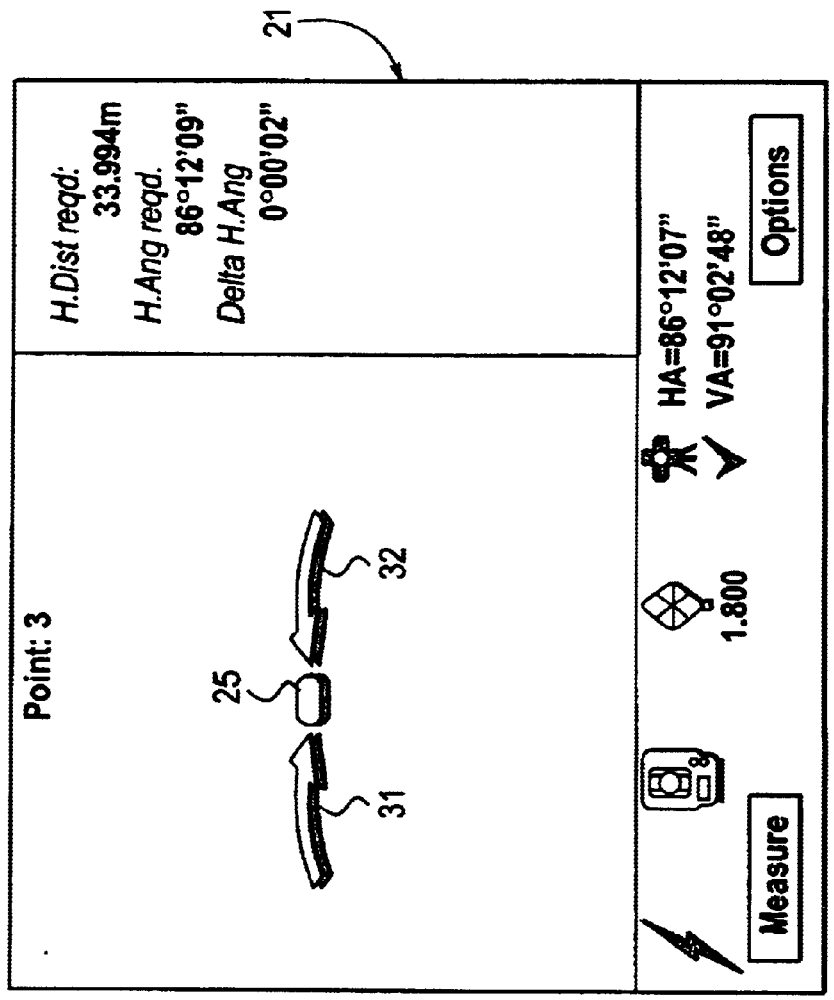
FIG. 3. shows a further depiction of the graphical display as shown in FIG. 2.
Figure 4:
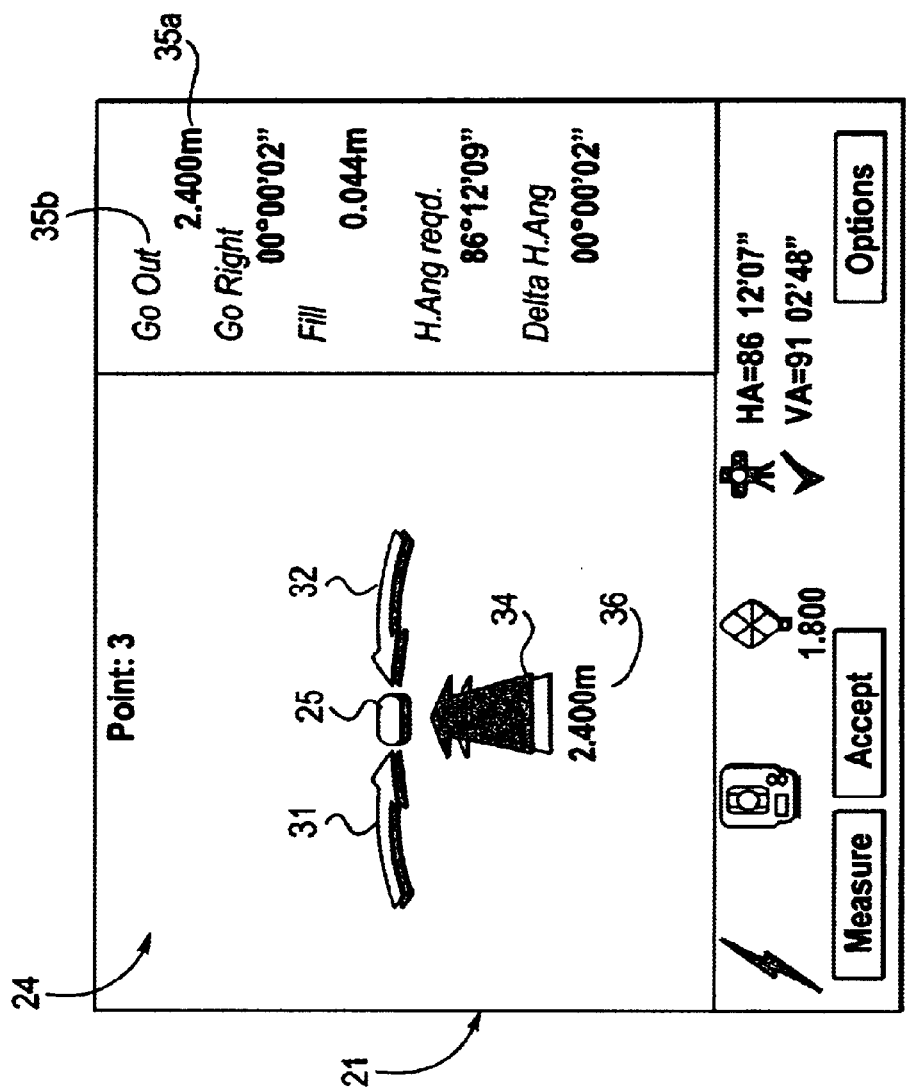
FIG. 4. Shows a further depiction of the graphical display as shown in FIGS. 2–3.

As shown in FIG. 3, once the optical instrument (16) is placed on-line by being turned through the required angle, the solid colored arrow (26) is replaced by a new arrow (31) with a hollow/outlined appearance. A second arrow (32) is now also displayed on the opposing side of the circular element (25) with a reciprocal orientation to the first arrow symbol (31). Both arrows are aligned in a substantially horizontal plane symmetrically about a vertical axis through said circular element, indicating to the operator that the optical instrument is displaying the desired horizontal angle.

The first operator (12) then takes a distance measurement (via the integrated EDM device) to the range pole (20) and any discrepancy between the measured and the desired distance results in a third vertically orientated arrow being displayed in frame (24).

The third arrow points towards the center element (25) from either above (arrow (33)) or below, (arrow (34)) depending on whether the range pole (20) needs to be moved towards or away (respectively) from the survey site (18) to reach the stake-out point (19), with the magnitude of the movement displayed at the foot of arrow (33) or (34) by alpha-numerical display (35) or (36) respectively. Display (35a) in frame (23) duplicates the data shown by display (35) or (36) and is located under the heading (35b) 'GO OUT' or 'GO IN' as appropriate. In the example shown in FIG. 4, the orientation of arrow (33) (pointing vertically upwards) together with alpha-numeric display (34, 35) indicates that range pole needs to be moved 2.400 meters away from the survey location (18). The solid (blank) colored/ filled appearance of the third arrow (33) denotes, as previously noted, that the, indicated parameter (i.e. distance to stakeout point (19)) is not within the tolerance set by the operator and that a corrective movement is required. It will be further noted that unlike arrows (31, 32), in the present embodiment the shaft of arrow (33) is straight rather than curved. This provides an effective means of indicating that the associated numerical displays (34, 35) refer to a linear distance measurement and not an angular measurement.

The second operator (14) is then instructed to move the indicated amount and a further reading is taken. If the optical instrument (16) needs to be turned off-line in order to sight the range pole (20), then the two horizontally opposed hollow/outlined arrows (31, 32) are replaced by alphanumeric display (27) and the single solid/filled arrow (26) respectively showing the angular value and direction of the correction required to place the optical instrument (16) back on-line. In the example shown in FIG. 5, arrow (33) and associated alpha-numeric display (35) indicates the range pole (20) needs to be moved 0.105 m towards the survey site (18), whilst the curved horizontal arrow (26) indicates that the optical instrument (16) also needs to be turned 0°59'08" to the right.

Figures 5, 6:
FIG. 5. shows a further depiction of the graphical display as shown in FIGS. 2–4.
FIG. 6. shows a further depiction of the graphical display as shown in FIGS. 2–5.
Figure 8:
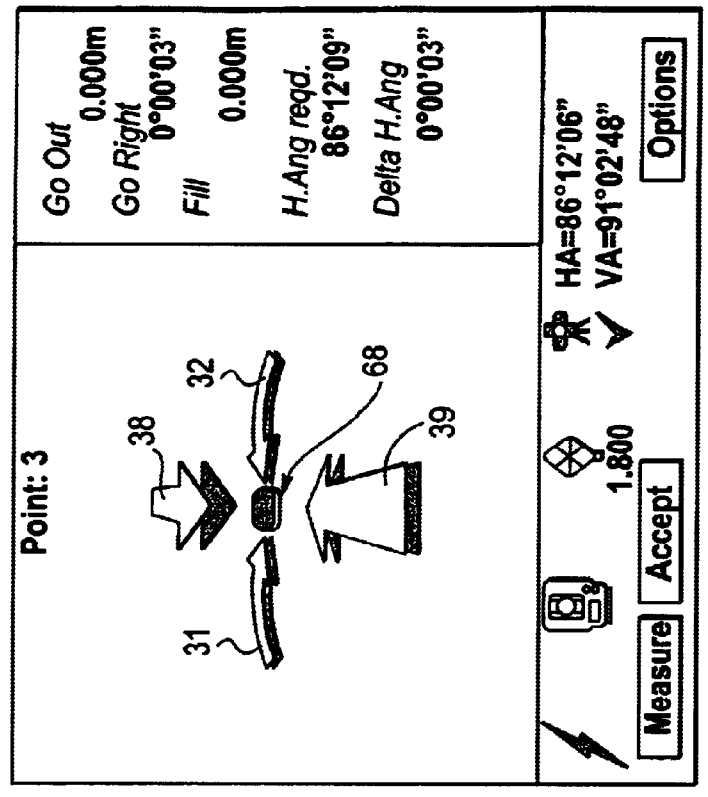
FIG. 8. shows a further depiction of the graphical display as shown in FIGS. 2–7.
Figure 7:
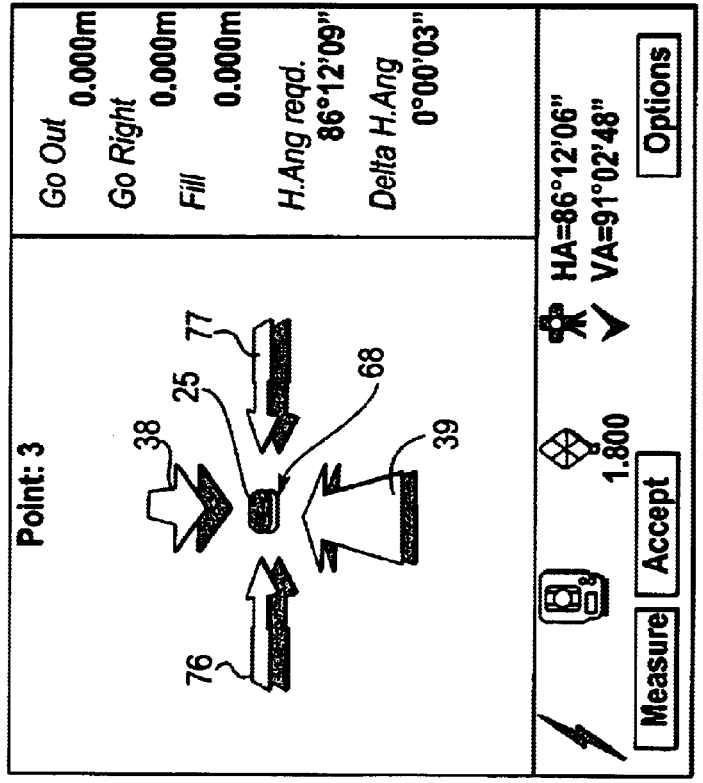
FIG. 7. shows a further depiction of the graphical display as shown in FIGS. 2–6.

The display (21) may operate in a number of modes, including 'Angles and Distances' and 'Distances'. FIGS. 2–5 & 8 show the display (21) in the 'Angles and Distances' mode, which as implied by the title, refers to the combined angular (arrows (26, 31, 32)) and distance (arrows (33) and (34)) representations used. FIG. 6 shows an equivalent display to that shown in FIG. 5 with the display (21) operating in 'Distances' mode, wherein the curved arrow (26) is replaced by a straight shafted arrow (37) representing the direction orthogonal to the line of sight between the range pole (20) and the optical instrument (16), in which the second operator should move the range pole (20). Alpha-numeric display (38) adjacent to arrow (37) displays the magnitude of the required movement, instead of the angular value shown in the corresponding display (27) in the 'Angles and Distances' mode shown in FIG. 5.

The above measurements and corrective movements are repeated until the range pole location is within the distance and/or angular tolerance set by the operator, whereupon (as shown in figure (7)) two vertical (38, 39) and two horizontal (76,77 hollow/outlined arrows are concurrently displayed, all pointing towards the center element (25) which is now displayed as a solid black circle. In comparison to the 'Distances' mode shown in FIG. 7, the corresponding 'Angles and Distances' mode shown in FIG. 8 differs in that curved horizontal arrows (31) and (32) replace the straight shafted arrows (76) and (77). There are no associated alpha-numeric displays for any of the hollow arrows as no corrective movements are now required.

One embodiment of the logical steps associated with displaying the appropriate graphical symbols for the horizontal angle measurements are illustrated in the flow chart in FIG. 9. Although the specific implementation of the principles characterizing the invention (10) may be achieved in a variety of ways, in this embodiment, the acceptable accuracy tolerance (40) may be defined by. the operator as an absolute value with the angles to the left and right of the stakeout point (19) measured as negative and positive values (respectively) between 0–180°.

When the optical instrument is turned to a new horizontal angle (41), either in isolation (e.g. placing the instrument 'on-line') or as the initial stage before taking a distance reading to the target (e.g. range pole (20)) then the first stage is to calculate (step 40) the value of the angle (41).

If the angle (41) is greater than or equal to zero (thus indicating that the target is either on-line or to the right of the stakeout site (19), as viewed from the survey site (18)), this is followed by step 43. This determines whether the angle (41) exceeds the operator defined tolerance (T1) and if so, arrow (44) and corresponding alpha-numeric display (45). are drawn on display (21) in steps (46) and (48) respectively.

Arrow (44) and associated alpha-numeric display (27) are the compliment to the curved arrow (26) and alpha-numeric display (27).

If the angle (41) is less than zero, (i.e. negative, indicating the -measured location is to the left of the stakeout point (19) represented by the circular element 25) and the modulus of the angle (41) exceeds the tolerance (T1) (step stakeout point (19) target (i.e. error 2 (72)) is determined and displayed by the appropriate graphical symbol in steps (56a)–(70) which correspond directly to like-numbered steps in FIG. 10 (with the aforesaid exception that error (55) is replaced by error 2 (72)).

It will be appreciated that the graphical shapes used to denote movement corrections need not be restricted to arrows as hereinbefore described. Alternatives could include varying the size of the arrow as a function of the magnitude of the measured property (distance or angle). Moreover, different symbols could be displayed to indicate when the measured location (e.g. the range pole (20)) is moved between one or more predetermined tolerance levels.

Some or all of the steps set forth for the flow charts shown in FIGS. 9–10 and as hereinbefore described may be embodied as instructions stored on a medium such as memory storage devices, transmission media and so forth, which when executed by a processor performs the steps described.

In a further embodiment, the present invention may be implemented as part of a single person stakeout system utilizing a remotely-operated robotic optical instrument. This embodiment operates on a reciprocal basis to the aforementioned embodiments in that the second operator (14) is equipped with a display (21). It will be appreciated that, although referred to for consistency as the 'second operator (14)', there need only be one operator for this. embodiment. The direction of the corrective movements required to align the range pole (20) with the stakeout location (19) from the perspective is shown in display (21) of the second operator/range pole (14,20) rather than the conventional optical instrument (16).

Figure 11:
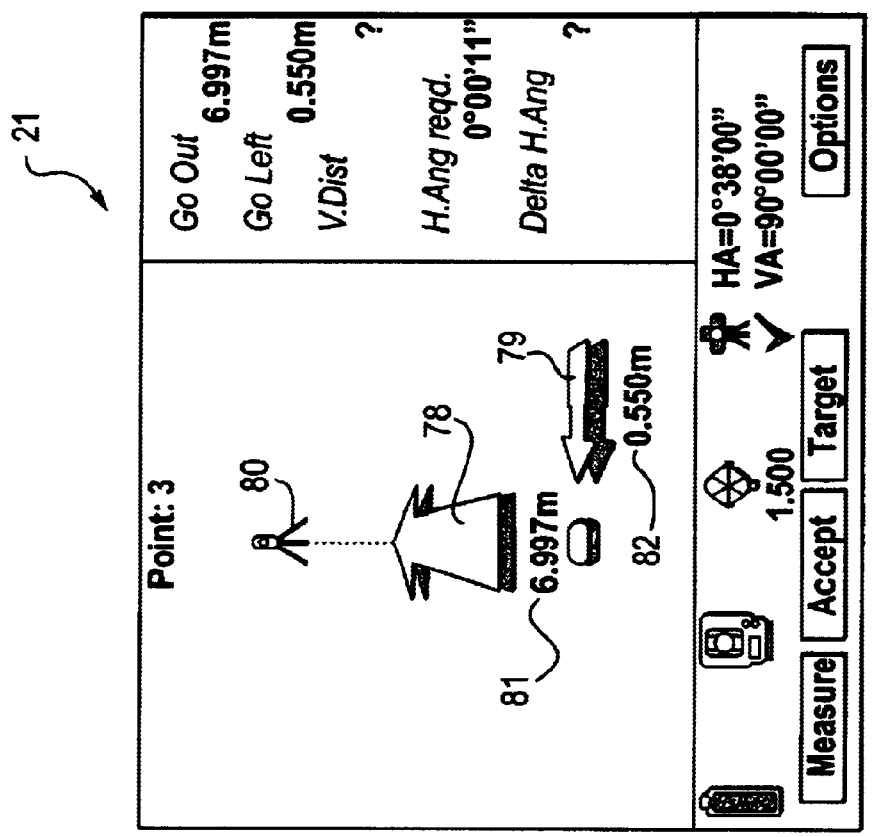
FIG. 11. shows a further embodiment of the graphical display shown in FIGS. 2–8.

FIG. 11, shows the appearance of the display (21) held by the second operator (14) in this embodiment. In addition to horizontal and vertical arrows ((78) and (79) respectively) and center element (25), frame (23) also shows a graphical representation (80) of the optical instrument (16) towards the upper center of the frame. The direction of the arrows (78,79) in this instance, denotes the direction the second operator. should move the range pole (20) when orientated to face the optical instrument (16). Thus, although the alphanumeric readings ((81) and (82) respectively) associated with arrows (78,79) would give the same value in the corresponding displays ((34) and (38) respectively), if the measurements were being viewed at the optical instrument (16), the directions of both arrows are reversed. As the angular value (41) for corrective movements in previous embodiments relates to the angle subtended at the optical instrument (16), it is thus meaningless for the second operator (14) and consequently, all the corrective movements are expressed as distances.

In this embodiment, the conventional optical instrument (16) is replaced by a robotic total station which has the capability of remote operation.

Figure 12:
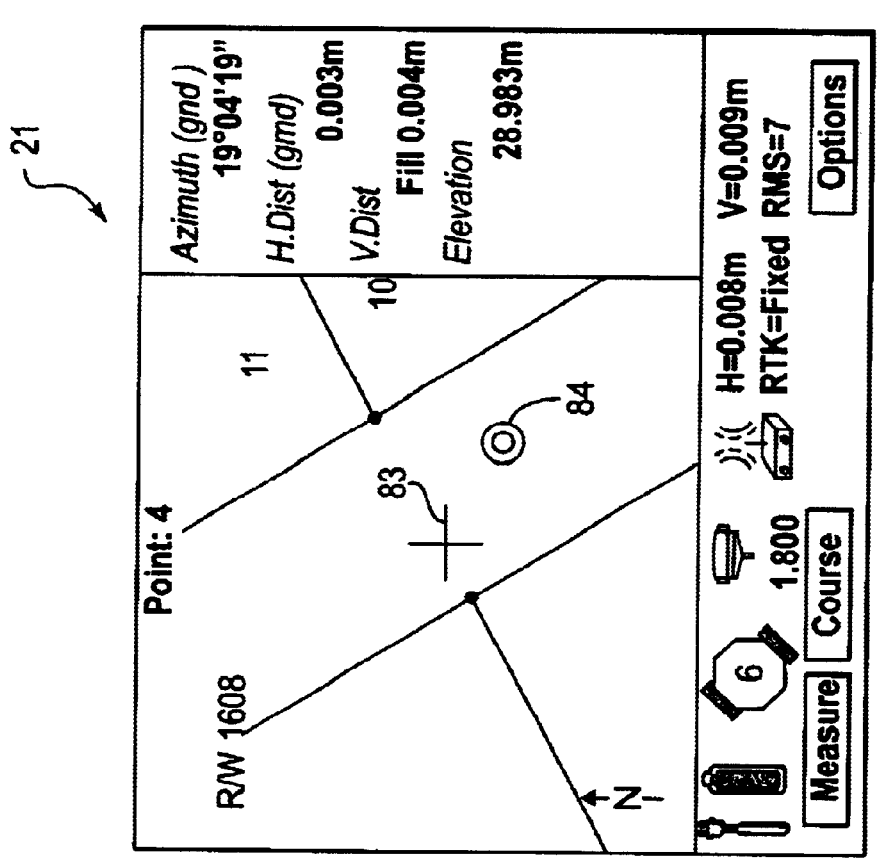
FIG. 12. shows a further embodiment of the graphical display shown in FIGS. 2–8.
Figure 13:
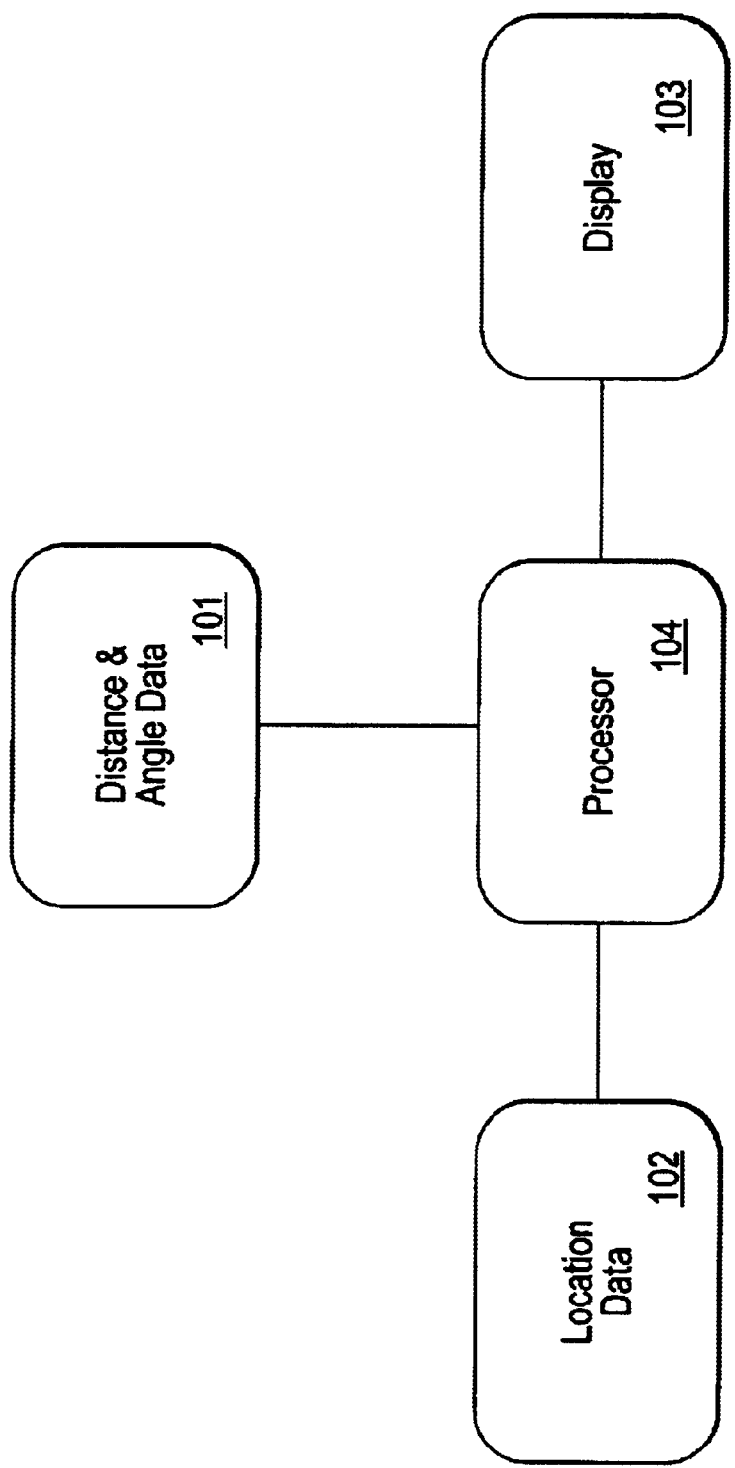
FIG. 13. shows a block diagram of the system components of one embodiment.

In an alternative embodiment of the present invention, the display (21) may optionally show a digitized map in frame (24) which can be overlaid with the said graphical symbols such as the arrows shown in the previous embodiments. A cross-hair (83) and bulls-eye (84) graphic may be employed, as shown in FIG. 12. The-map display function would enable the operator to view peripheral features/terrain surrounding the stakeout area. The map may be stored, for example, as a bitmap or DXF file, which may be uploaded from or used in conjunction with the Trimble Survey Office software from Trimble Navigation Ltd.

Although the above embodiments have been described with reference to using a GPS receiver (15) to establish the location of the survey site (18), it will be readily apparent that conventional non-GPS surveying techniques may be employed to the same end.

It will be appreciated that the invention need not be solely implemented in a specific system described herein and may form part of a more general system.

Such a general system may include the elements shown schematically in FIG. (13), namely distance and angular measurement data (101), location data (102) and a display (103), all linked to a processing unit (104). The distance and angular measurement data (101) may be obtained by one or more appropriate sources, in addition to optical surveying techniques. Similarly, the location data (102) which indicates the position of the observation/survey site may be obtained from a suitable source including position signals from a GPS receiver engaged in supplying position signals to other inputs/users.

The data inputs (101, 102) are used by the processing unit (104) to calculate and output the said separation value on display unit (103).

Similarly, both display (103) and processing unit (104) may form part of one or more systems capable of performing operations distinct from the present invention.

Furthermore, the present invention need not be restricted solely to surveying applications and may in fact be employed in any application requiring the guidance of two remote objects and/or locations towards each other by the relative movement of at least one of said objects/locations.

What is claimed is:

1. A graphical display configured to provide at least one graphical symbol indicative of a separation value between a first and second location, the separation value relating to a value selected from a group comprising a distance between the first and second location and subtended between the first and second location at a predetermined reference point, wherein the graphical symbol is resolved into components comprising at least one pair of opposing arrows and at least one arrow of the at least one pair of opposing arrows denotes a corresponding separation value component.

2. The graphical display of claim 1, further comprising at least one alphanumeric symbol to represent the magnitude of the separation value.

3. The graphical display of claim 1, wherein the graphical symbol is resolved into mutually orthogonal components.

4. The graphical display of claim 3, wherein the mutually orthogonal components are orientated vertically and horizontally.

5. The graphical display of claim 1, wherein the components comprise one pair of vertically opposed arrows and one pair of horizontally opposed arrows.

6. The graphical display of claim 1, wherein at least one of the opposed arrows corresponding to the angle subtended between the first location and the second location at the predetermined reference point, exhibits a curved appearance.

7. The graphical display of claim 1, wherein the arrows point towards a center graphical element, the center graphical element comprising either the first location or the second location from the location of the other of the first or second location.

8. The graphical display of claim 1, wherein one of the arrows is displayed if a corresponding separation value component exceeds a predetermined threshold value.

9. The graphical display of claim 1, wherein both of the opposing arrows are displayed if a corresponding separation value component is less than a predetermined threshold value.

10. The graphical display of claim 1, wherein the magnitude of the separation value presented in alpha-numeric form is displayed adjacent to a corresponding graphical symbol.

11. The graphical display of claim 1, wherein the appearance of the graphical symbol is changed in relation to the magnitude of the separation value.

12. The graphical display of claim 1, wherein the reference point is a survey site, one of the first or second location is a survey stakeout point, and the other first or second location is a mobile surveying range pole.

13. A method of determining and displaying a separation value between a first and second location using a measurement device, as observed from a predetermined reference point, the method comprising:
   determining the location of the measurement device;
   inputting the location of one of either the first location or the second location;
   determining the distance and angular orientation of the other of the first location or second location with respect to a reference point;
   calculating and displaying a separation value as at least one first graphical symbol; and
   displaying at least one second graphical symbol if the separation value is less than a predetermined threshold.

14. The method of claim 13, further comprising the use of a positioning system receiver as a locator to establish the location of the reference point.

15. The method of claim 13, wherein locations are defined according to a predetermined frame of reference selected from a group comprising a standard GPS reference ellipsoid WGS-84, and a local system.

16. The method of claim 13, wherein the separation value relates to a value selected from a group comprising a distance between the first and second locations and an angle subtended between the first and second location at a predetermined reference point.

17. The method of claim 13, further comprising the step of displaying at least one alpha-numeric symbol representing the magnitude of the separation value.

18. The method of claim 13, wherein the graphical symbol is resolved into components comprising at least one pair of opposed arrows, at least one arrow of the at least one pair of opposed arrows denoting a corresponding separation value component.

19. The method of claim 18, wherein a curved appearance is exhibited for one arrow of the at least one pair of opposed arrows, when the separation component corresponds to the angle subtended between the first location and the second location at a predetermined reference point.

20. The method of claim 18, further comprising the display of a single arrow of the pair of opposed arrows if a corresponding separation value component exceeds a predetermined threshold value.

21. The method of claim 18, further comprising the display of both arrows of the pair of opposed arrows if a corresponding separation value component is less than a predetermined threshold value.

22. The method of claim 13, wherein the graphical symbol is varied in appearance according to the magnitude of the separation value.

23. A system configured to provide at least one graphical symbol indicative of a separation value between a first and second location, the separation value relating to a value selected from a group, the system comprising:
   a distance device and an angular measuring device configured to determine a separation value between a first and second location a graphical display coupled to the distance and angular measuring device, the graphical display capable of providing graphical symbols indicative of a separation value related to a value selected from a group comprising a direct distance between the first and second location and subtended between the first and second location at a predetermined reference point, wherein the graphical symbol is resolved into components comprising at least one pair of opposing arrows and at least one arrow of the at least one pair of opposing arrows denotes a corresponding separation value component.

24. The system of claim 23 wherein the distance measuring device is an electronic distance measuring device.

25. The system of claim 23 wherein the angular measuring device is a survey instrument.

26. The system of claim 23, further comprising a locating device.

27. The system of claim 26, wherein the locating device comprises a positioning system receiver.

28. A computer readable medium containing instructions which when executed in a processing system performs a process for determining and displaying a separation value between a first and second locations comprising:

determining a location of a measurement device;

receiving a location of one of either the first location or the second location;

determining a distance and angular orientation of the other of the first location or second location with respect to a reference point;

calculating and displaying a separation value as at least one first graphical symbol; and displaying at least one second graphical symbol if the separation value is less than a predetermined threshold.

29. The computer readable medium of claim 28, wherein the separation value relates to a value selected from the group comprising a distance between the first and second locations and an angle subtended between the first and second location at a predetermined reference point.

30. The computer readable medium of claim 28, further comprising instructions, which when executed display at least one alpha-numeric symbol representing the magnitude of the separation value.

31. The computer readable medium of claim 28, wherein the graphical symbol is resolved into components comprising at least one pair of opposed arrows, at least one arrow of the at least one pair of opposed arrows denoting a corresponding separation value component.

32. The computer readable medium of claim 31, wherein a curved appearance is exhibited for one arrow of the at least one pair of opposed arrows, when the separation component corresponds to the angle subtended between the first location and the second location at a predetermined reference point.

33. The computer readable medium of claim 31, further comprising instructions, which when executed, display a single arrow of the pair of arrows if a corresponding separation value component exceeds a predetermined threshold value.

34. The computer readable medium of claim 31, further comprising instructions, which when executed, display both arrows of the pair of arrows if a corresponding separation value component is less than a predetermined threshold value.

* * * * *